United States Patent
Kono et al.

(10) Patent No.: US 9,742,020 B2
(45) Date of Patent: Aug. 22, 2017

(54) FUEL CELL

(71) Applicant: TOYOTA JIDOSHA KABUSHIKI KAISHA, Toyota-shi, Aichi (JP)

(72) Inventors: Noriko Kono, Tajimi (JP); Takahiro Kusumegi, Toyota (JP); Yusaku Onochi, Toyota (JP); Tatsuhiro Sugimoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1 day.

(21) Appl. No.: 14/654,321

(22) PCT Filed: Dec. 19, 2013

(86) PCT No.: PCT/JP2013/084024
§ 371 (c)(1),
(2) Date: Jun. 19, 2015

(87) PCT Pub. No.: WO2014/098171
PCT Pub. Date: Jun. 26, 2014

(65) Prior Publication Data
US 2015/0357668 A1    Dec. 10, 2015

(30) Foreign Application Priority Data

Dec. 20, 2012 (JP) ................. 2012-278610

(51) Int. Cl.
*H01M 8/22* (2006.01)
*H01M 4/96* (2006.01)
*H01M 8/103* (2016.01)
*H01M 4/86* (2006.01)
*H01M 8/1018* (2016.01)

(52) U.S. Cl.
CPC ............. *H01M 8/222* (2013.01); *H01M 4/96* (2013.01); *H01M 8/103* (2013.01); *H01M 2004/8684* (2013.01); *H01M 2008/1095* (2013.01)

(58) Field of Classification Search
CPC ........ H01M 4/96; H01M 8/103; H01M 8/222; H01M 2004/8684; H01M 2008/1095; Y02E 60/527
(Continued)

(56) References Cited

U.S. PATENT DOCUMENTS

| 8,440,333 B2 | 5/2013 | Nakagawa et al. |
| 2010/0178572 A1 | 7/2010 | Kato et al. |

(Continued)

FOREIGN PATENT DOCUMENTS

| CN | 101682070 A | 3/2010 |
| CN | 104870630 A | 8/2015 |

(Continued)

OTHER PUBLICATIONS

Decision of Patent issued Jan. 19, 2016 in counterpart Japanese Patent Application No. 2014-553197.
(Continued)

*Primary Examiner* — Patrick Ryan
*Assistant Examiner* — Claire L Roe
(74) *Attorney, Agent, or Firm* — Sughrue Mion, PLLC

(57) ABSTRACT

A fuel cell capable of achieving excellent power output, which comprises a non-catalytic anode electrode and in which a reductant is used as a fuel, is provided.
The fuel cell of the present invention comprises an anode electrode, a cathode electrode, and a membrane having ion conductivity that is disposed between the anode electrode and the cathode electrode, in which a reducing fuel in the anode electrode is oxidized in the presence of a heterocyclic compound containing nitrogen and carbon atoms and having 5- or 6-membered ring.

9 Claims, 6 Drawing Sheets

(58) Field of Classification Search
USPC .......................................................... 429/504
See application file for complete search history.

(56) References Cited

U.S. PATENT DOCUMENTS

| | | | | |
|---|---|---|---|---|
| 2010/0310946 | A1* | 12/2010 | Sakai | ..................... H01M 4/86 |
| | | | | 429/408 |
| 2013/0161204 | A1 | 6/2013 | Uchiyama et al. | |
| 2014/0024102 | A1 | 1/2014 | Sakai et al. | |
| 2015/0315549 | A1 | 11/2015 | Kono et al. | |

FOREIGN PATENT DOCUMENTS

| | | |
|---|---|---|
| JP | 2008-060067 A | 3/2008 |
| JP | 2008-071584 A | 3/2008 |
| JP | 2009-510705 A | 3/2009 |
| JP | 2012-190787 A | 10/2012 |
| WO | 2004/019436 A1 | 3/2004 |
| WO | 2008/033113 A2 | 3/2008 |
| WO | 2012/042903 A1 | 4/2012 |

OTHER PUBLICATIONS

Notice of Reasons for Refusal issued Oct. 30, 2016 in counterpart Japanese Patent Application No. 2014-553197.

Naoko Fujiwara et al., "Direct oxidation of L-ascorbic acid on a carbon black electrode in acidic media and polymer electrolyte fuel cells", Electrochemistry Communications, May 2006, pp. 720-724, vol. 8, Iss. 5.

Kenji Ishibashi et al., "Pentacyanoferrate and Bilirubin Oxidase-bound Polymer for Oxygen Reduction Bio-cathode", Electrochemisty, 2008, pp. 594-596, vol. 76, No. 8.

* cited by examiner

FUEL CELL

TECHNICAL FIELD

The present invention relates to a fuel cell comprising a non-catalytic anode electrode, in which a reducing fuel is used.

BACKGROUND ART

Fuel cells having a structure in which an anode electrode and a cathode electrode face each other across a membrane having ion conductivity have been known as, for example, polymer electrolyte fuel cells. In general, fuel cells have a layered structure in which an anode electrode is disposed on one surface of a membrane having ion conductivity (e.g., an electrolyte membrane comprising an ion-exchange resin) and a cathode electrode is disposed on the other surface thereof.

A fuel (e.g., hydrogen) is supplied to the anode electrode and then protons ($H^+$) are obtained as a result of catalysis while two electrons ($e^-$) are released toward the cathode electrode. Protons produced at the anode electrode pass through the membrane having ion conductivity to reach the cathode electrode. Then, as a result of catalysis, protons receive two electrons ($e^-$) released from the anode electrode and, together with oxygen ions generated from externally supplied oxygen, form water. Electrons migrate through an external circuit, producing an electric current.

Specifically, the reaction represented by $H_2 \rightarrow 2H^+ + 2e^-$ takes place on the anode side and the reaction represented by $2H^+ + \frac{1}{2}O_2 + 2e^- \rightarrow H_2O$ takes place on the cathode side. That is, the overall reaction represented by $H_2 + \frac{1}{2}O_2 \rightarrow H_2O$ takes place for power generation. In order for chemical reactions to proceed with good efficiency, catalysts are used for electrodes as described above. For example, platinum is often used in polymer electrolyte fuel cells.

In recent years, fuel cells (biofuel cells) in which desired reactions are allowed to exclusively proceed with the use of enzymes as catalysts have been suggested. In these biofuel cells, a fuel is decomposed using enzymes that function as catalysts so as to be separated into protons and electrons. Fuels containing alcohol such as methanol or ethanol, a monosaccharide such as glucose, or a polysaccharide such as starch are used for such biofuel cells that have been developed.

Non-Patent Document 1 and Patent Document 1 disclose biofuel cells in which an electron transfer mediator is immobilized on an electrode. Polyvinylimidazole is used as a solidifying agent for immobilizing an electron transfer mediator on an electrode material for the biofuel cells disclosed in Non-Patent Document 1 and Patent Document 1.

In addition, Patent Document 2 discloses a fuel cell having a structure in which a positive electrode and a negative electrode face each other across an electrolyte containing a buffer substance, an immobilized enzyme is used for either one or both of the positive electrode and the negative electrode, and a compound containing an imidazole ring is used as the buffer substance. The fuel cell disclosed in Patent Document 2 is produced by immobilizing bilirubin oxidase on a positive electrode and, when an electrolyte containing an imidazole buffer solution is used, a high current density is achieved for unipolar evaluation of a cathode electrode.

Further, Patent Document 3 discloses a sensor for measuring a blood sugar level using an enzyme and an electron receptor. The sensor disclosed in Patent Document 3 includes a heterocyclic compound such as imidazole as well as an enzyme and an electron receptor so as to improve preservation stability of the enzyme (for suppression of changes in the current value before, during, and after preservation).

Meanwhile, fuel cells in which an anode electrode does not have a catalytic function and power generation is achieved through direct oxidization of fuel itself have been known, as described above. Specifically, it is known that fuel cells in which a reductant such as an aqueous solution of ascorbic acid or the like is used as a fuel and an anode electrode does not have a catalytic function can generate power at ordinary temperature and ordinary pressure through oxidation of the reductant (Non-Patent Document 2).

PRIOR ART DOCUMENTS

Patent Documents

Patent Document 1: JP Patent Publication (Kokai) No. 2008-71584 A
Patent Document 2: JP Patent Publication (Kokai) No. 2008-60067 A
Patent Document 3: WO2012/042903

Non-Patent Documents

Non-Patent Document 1: Electrochemistry 76, No. 8, (2008) pp. 594-596
Non-Patent Document 2: Electrochemistry Communications, Volume 8, Issue 5, May 2006, pages 720-724

SUMMARY OF THE INVENTION

Problem to Be Solved by the Invention

However, reactivity on the anode side is low in the above fuel cells in which a reductant is used as a fuel, making it impossible to obtain sufficient power output, which has been problematic. In consideration of such circumstances, an object of the present invention is to provide a fuel cell capable of achieving excellent power output, which comprises a non-catalytic anode electrode and in which a reductant is used as a fuel.

Means for Solving the Problem

The present invention whereby the above object has been achieved encompasses the followings.

(1) A fuel cell, comprising an anode electrode, a cathode electrode, and a membrane having ion conductivity that is disposed between the anode electrode and the cathode electrode, wherein a reducing fuel in the anode electrode is oxidized in the presence of a heterocyclic compound containing nitrogen and carbon atoms and having 5- or 6-membered ring.

(2) The fuel cell according to (1), wherein the anode electrode contains neither a noble metal catalyst nor an enzyme.

(3) The fuel cell according to (1), wherein the reducing fuel is at least one reducing fuel selected from the group consisting of ascorbic acid, reduced nicotinamide adenine dinucleotide, reduced nicotinamide adenine dinucleotide phosphate, and hydrogen.

(4) The fuel cell according to (1), wherein the compound is contained in a fuel that comes into contact with the anode electrode.

(5) The fuel cell according to (1), wherein the compound is present on the surface of the anode electrode, with which the fuel comes into contact.

(6) The fuel cell according to (1), wherein the reducing fuel contains the compound at a concentration of 0.2-5.0 M.

(7) The fuel cell according to (1), wherein the anode electrode comprises a carbon material.

(8) The fuel cell according to (1), wherein the heterocyclic compound is a heterocyclic compound containing nitrogen atoms having 5-membered ring.

(9) The fuel cell according to (1), wherein the heterocyclic compound is a compound containing an imidazole ring.

(10) The fuel cell according to (1), wherein the heterocyclic compound is at least one compound selected from the group consisting of pyrazole, thiazole, 1-vinylimidazole, polyvinylimidazole, and histidine.

This description includes all or part of the contents as disclosed in the description and/or drawings of Japanese Patent Application No. 2012-278610, to which the present application claims priority.

Effects of the Invention

According to the present invention, it is possible to significantly improve power output from a fuel cell comprising a non-catalytic anode electrode, in which a reductant is used as a fuel.

EMBODIMENTS FOR CARRYING OUT THE INVENTION

The present invention is described in detail below with reference to the drawings.

According to the present invention, the term "fuel cell" refers to a fuel cell in which a cathode electrode and an anode electrode face each other across an electrolyte such that a reducing fuel supplied to the anode electrode is oxidized in the presence of a heterocyclic compound containing nitrogen and carbon atoms and having 5- or 6-membered ring. It is particularly preferable that at least the anode electrode or both the cathode electrode and the anode electrode not have a catalytic function in the fuel cell of the present invention.

Figure 1:
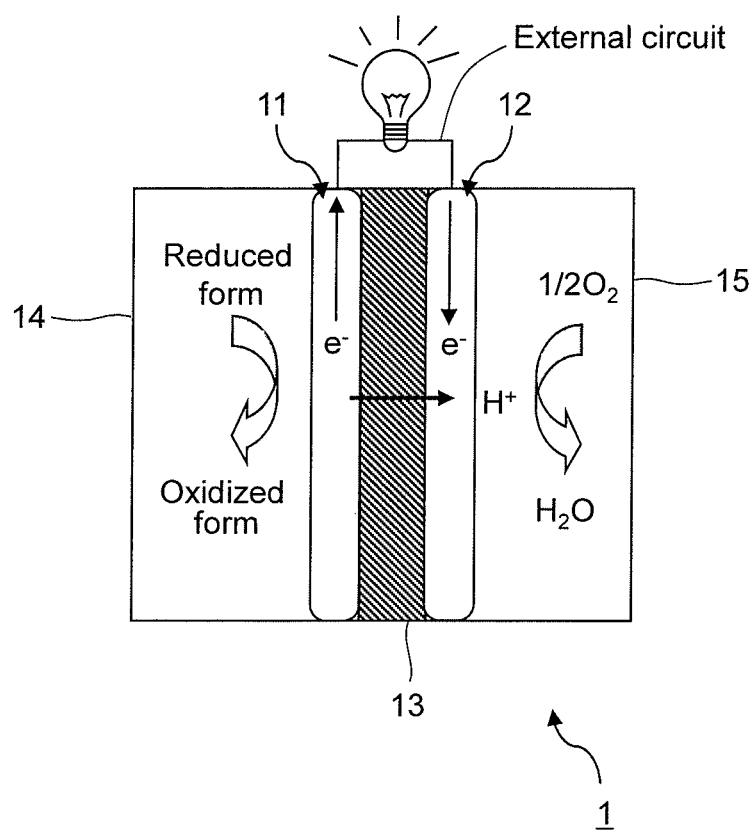
FIG. 1 schematically shows an example of a fuel cell according to the present invention.

FIG. 1 schematically shows an example of the fuel cell of the present invention. A fuel cell 1 shown in FIG. 1 comprises an anode electrode 11, a cathode electrode 12, and a membrane 13 having ion conductivity (hereafter referred to as "electrolyte membrane 13") that is disposed between the anode electrode 11 and the cathode electrode 12. Here, the anode electrode 11 is disposed inside an anode chamber 14 and the cathode electrode 12 is disposed inside a cathode chamber 15 in the fuel cell 1. The anode chamber 14 is charged or supplied with a reducing fuel. It is particularly preferable that a reducing fuel charged or supplied to the anode chamber 14 contain a reductant that serves as a fuel and a heterocyclic compound containing nitrogen and carbon atoms and having 5- or 6-membered ring.

Further, the heterocyclic compound containing nitrogen and carbon atoms and having 5- or 6-membered ring may be preliminarily mixed with the reducing fuel charged or supplied to the anode chamber 14 or it may be supplied to the anode chamber 14 separately from the reducing fuel in the fuel cell of the present invention. Also, the heterocyclic compound containing nitrogen and carbon atoms and having 5- or 6-membered ring may be present on the surface of the anode electrode 11, with which a reducing fuel comes into contact, in the fuel cell of the present invention. For example, a solution containing a heterocyclic compound containing nitrogen and carbon atoms and having 5- or 6-membered ring is applied to the surface of the anode electrode 11, with which a fuel comes into contact, thereby allowing the heterocyclic compound containing nitrogen and carbon atoms and having 5- or 6-membered ring to be present on the surface. Alternatively, when an electrode material that constitutes the anode electrode 11 is prepared, the heterocyclic compound containing nitrogen and carbon atoms and having 5- or 6-membered ring may be mixed with the electrode material.

The term "reducing fuel" used herein refers to a compound (reductant) that reduces other chemical species through a redox reaction. That is, a reducing fuel is oxidized through a redox reaction, meaning that such reducing fuel is an electron donor. Examples of a reducing fuel that can be used in the fuel cell 1 include ascorbic acid, reduced nicotinamide adenine dinucleotide (NADH), reduced nicotinamide adenine dinucleotide phosphate (NADPH), and hydrogen. Of these, it is preferable to use, as a reducing fuel, at least one member selected from the group consisting of ascorbic acid, NADH, and NADPH. It is particularly preferable to use ascorbic acid as a reducing fuel.

The concentration of a reducing fuel (i.e., the concentration of a reductant) is not particularly limited; however, it can be, for example, 0.2-2.0M. If the concentration of a reducing fuel is above this range, it might cause insufficient substrate diffusion due to increased viscosity, which is problematic. In addition, if the concentration of a reducing fuel is below such range, sufficient power output might not be obtained, which is disadvantageous.

The term "heterocyclic compound containing nitrogen and carbon atoms and having 5- or 6-membered ring" used herein refers to a compound obtained by substituting at least one carbon atom and preferably two carbon atoms with a nitrogen atom(s) in a 5- or 6-membered ring compound consisting of only carbon atoms. The heterocyclic compound may be an aliphatic compound or an aromatic compound. Examples of an aliphatic heterocyclic compound containing nitrogen atoms having 5- or 6-membered ring include, but are not particularly limited to, 2-imidazolidinone, piperidine, piperazine, morpholine, pyrrolidine, and derivatives thereof. Examples of an aromatic heterocyclic compound containing nitrogen atoms having a 5- or 6-membered ring include, but are not particularly limited to, pyrrole, imidazole, pyrazole, oxazole, isooxazole, thiazole, isothiazole, triazole, pyridine, pyrimidine, pyridazine, pyrazine, 1,2,3-triazine, bipyridine, and derivatives thereof. It is particularly preferable to use a heterocyclic compound containing nitrogen atoms having a 5-membered ring and especially an aromatic heterocyclic compound containing nitrogen atoms having a 5-membered ring. The use of a heterocyclic compound containing nitrogen atoms having a 5-membered ring and especially an aromatic heterocyclic compound containing nitrogen atoms having a 5-membered ring allows the improvement of power output from fuel cells. Among the heterocyclic compounds listed above, examples of a heterocyclic compound containing nitrogen atoms having a 5-membered ring include pyrrolidine, pyrrole, imidazole, pyrazole, oxazole, isooxazole, thiazole, and isothiazole.

In addition, the heterocyclic compound containing nitrogen and carbon atoms and having 5- or 6-membered ring is preferably a compound containing an imidazole ring (i.e., an imidazole derivative or imidazole compound). The use of a compound containing an imidazole ring allows the improvement of power output from fuel cells.

More specifically, it is particularly preferable to use, as a heterocyclic compound containing nitrogen and carbon atoms and having 5- or 6-membered ring, compounds (of one or a plurality of species) selected from the group consisting of pyrazole, thiazole, 1-vinylimidazole, polyvinylimidazole, and histidine. The use of pyrazole, thiazole, 1-vinylimidazole, polyvinylimidazole, and histidine allows the significant improvement of power output from fuel cells.

Examples of a compound containing an imidazole ring include, but are not limited to, imidazole derivatives such as histidine, 1-vinylimidazole, 1-methylimidazole, 2-methylimidazole, 4-methylimidazole, 2-ethylimidazole, imidazole-2-carboxylate ethyl, imidazole-2-carboxaldehyde, imidazole-4-carboxylate, imidazole-4,5-dicarboxylate, imidazole-1-yl-acetate, 2-acetylbenzimidazole, 1-acetylimidazole, N-acetylimidazole, 2-aminobenzimidazole, N-(3-aminopropyl)imidazole, 5-amino-2-(trifluoromethyl)benzimidazole, 4-azabenzimidazole, 4-aza-2-mercaptobenzimidazole, benzimidazole, 1-benzylimidazole, and 1-butylimidazole, in addition to imidazole. Particularly preferably, imidazole, histidine, and/or 1-vinylimidazole are used as an imidazole compound. This is because the use of imidazole, histidine, and/or 1-vinylimidazole allows the significant improvement of enzyme activity of an immobilized enzyme.

As the compound containing an imidazole ring, polymers such as polyvinylimidazole, polybenzoimidazole, and derivatives thereof can be used. It is particularly preferable to use polyvinylimidazole. This is because the use of polyvinylimidazole allows the significant improvement of enzyme activity of an immobilized enzyme. In this regard, the molecular weights of the polymers are preferably 5000-1000000, more preferably 5000-200000, and most preferably 100000-200000.

Further, the concentration of an imidazole compound contained in a reducing fuel is not particularly limited as long as the imidazole compound is mixed with a solution when used. However, it is preferably 0.2-5.0 M and more preferably 0.5-2.0 M (note that the concentration is calculated in terms of imidazole groups). When the concentration of the imidazole compound is adjusted to fall within the above range, excellent reaction efficiency of the oxidation reaction of the reducing fuel and further improved power output can be achieved. If the concentration of the imidazole compound is below the range, the effect of improving the reaction efficiency of the oxidation reaction of the reducing fuel might be lowered, which is disadvantageous. In addition, if the concentration of the imidazole compound is above such range, the viscosity of the solution increases, which might result in reduced reactivity.

Furthermore, in a case in which the imidazole compound is applied to a support (i.e., the anode electrode 11) when used, the concentration of the imidazole compound is preferably 2.0-50 nmol/cm$^2$ and more preferably 5.0-20 nmol/cm$^2$. When the concentration of the imidazole compound is adjusted to fall within the above range, excellent reaction efficiency of the oxidation reaction of the reducing fuel and further improved power output can be achieved. If the concentration of the imidazole compound is below such range, the effect of improving the reaction efficiency of the oxidation reaction of the reducing fuel might be lowered, which is disadvantageous. In addition, if the concentration of the imidazole compound is above such range, the viscosity of the solution increases, which might result in reduced reactivity.

The anode electrode 11 used herein is composed of an electrode material having conductivity. It is preferable for the anode electrode 11 not to have a function for catalyzing the oxidation reaction of the reducing fuel. The condition of the anode electrode 11 not having a catalytic function substantially means that the anode electrode 11 does not contain an enzyme (including an immobilized enzyme) for biofuel cells or a noble metal catalyst such as platinum for polymer electrolyte fuel cells. That is, the fuel cell of the present invention does not include an enzyme for biofuel cells and a noble metal catalyst such as platinum for polymer electrolyte fuel cells, etc. The electrode materials that can be used include, but are not particularly limited to, carbon materials such as carbon black, carbon felt, carbon paper, and activated carbon.

Next, the cathode electrode 12 is described. The cathode electrode 12 is composed of an electrode material and an agent for reduction reactions. An agent for reduction reactions that can be used for the cathode electrode 12 comprises, for example, a carbon powder carrying, as an electrode catalyst, a metal catalyst such as platinum, or it comprises a mediator and an oxygen-reducing enzyme.

Examples of an oxygen-reducing enzyme that can be used as an agent for reduction reactions include bilirubin oxidase, laccase, and peroxidase. In addition, examples of a mediator that can be used include those similar to the aforementioned examples. Meanwhile, if the agent for reduction reactions comprises a carbon powder carrying a metal catalyst, examples of a metal catalyst that can be used include platinum, iron, nickel, cobalt, and ruthenium. In addition, examples of a carbon powder that can be used include carbon black such as acetylene black, furnace black, channel black, thermal black and so on.

In the cathode electrode 12 inside the cathode chamber 15, a reaction that generates water from oxygen ions and protons proceeds. Therefore, the cathode electrode 12 needs to be supplied with oxygen to be used in the reaction. For example, it is possible to supply oxygen to be used in the reaction by introducing a gas containing oxygen (e.g., air) to the cathode chamber 15. Alternatively, it is also possible to supply a buffer solution (containing oxygen) supplemented with a sacrificial reagent such as potassium ferricyanide to the cathode chamber 15. In addition, oxygen gas may be used if an agent used for reduction reactions that constitutes the cathode electrode 12 is a carbon powder carrying a metal catalyst such as platinum.

When an oxygen-reducing enzyme and a mediator are used for an agent for reduction reactions, an immobilized enzyme can be prepared as the cathode electrode 12 by immobilizing an oxygen-reducing enzyme and a mediator on an electrode material with the use of a polymer and a cross-linker. Alternatively, for example, it is also possible to prepare an immobilized enzyme that can be used for the cathode electrode 12 by dissolving an oxygen-reducing enzyme and a mediator in a buffer solution and immersing an electrode material in the solution. A polymer, a cross-linker, and a buffer solution that can be used herein are similar to those used for the anode electrode 11 described above. Meanwhile, if a carbon powder carrying a metal catalyst is used, a carbon powder carrying a metal catalyst is immobilized on an electrode material with the use of an electrolyte (e.g., a perfluorocarbon sulfonate-based electrolyte) that is similar to that used for an electrolyte membrane 13 described below for the cathode electrode 12.

In addition, an electrolyte membrane 13 is not particularly limited as long as it has proton conductivity but not electron conductivity. Examples of the electrolyte membrane 13 include a perfluorocarbon sulfonate-based resin membrane, a copolymer membrane of a trifluorostyrene derivative, a polybenzimidazole membrane impregnated with phosphoric acid, and an aromatic polyether ketone sulfonate membrane. One specific example is Nafion (registered trademark).

In the fuel cell 1 of the present invention that is composed in the above manner, when, for example, ascorbic acid is used as a reducing fuel to be supplied to the anode electrode 11, a redox reaction in the anode electrode 11 and that in the cathode electrode 12 are expressed by the following formula (1) and (2), respectively.

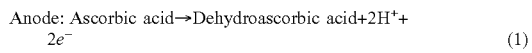

Anode: Ascorbic acid→Dehydroascorbic acid+2H$^+$+ 2e$^-$     (1)

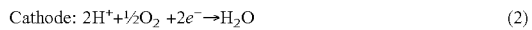

Cathode: 2H$^+$+½O$_2$ +2e$^-$→H$_2$O     (2)

That is, a reaction that oxidizes a reducing fuel such as ascorbic acid so as to generate hydrogen ions and electrons takes place in the anode electrode 11. The electrons are transferred by the mediator to the electrode material and further transferred via an external circuit to the cathode electrode 12. The hydrogen ions migrate to the cathode electrode 12 through the electrolyte membrane 13. Meanwhile, a reaction that causes hydrogen ions, electrons, and oxygen ions to react with each other so as to produce water takes place in the cathode electrode 12. As a result of these reactions, energy is released into the external circuit.

In the fuel cell 1 of the present invention, the oxidation reaction of the reducing fuel (e.g., the reaction (1)) proceeds in the presence of a heterocyclic compound containing nitrogen and carbon atoms and having 5- or 6-membered ring in the anode electrode 11. Thus, the fuel cell 1 of the present invention can achieve higher output than that in a case in which the oxidation reaction proceeds in the absence of a heterocyclic compound containing nitrogen and carbon atoms and having 5- or 6-membered ring.

EXAMPLES

The present invention is described in more detail with reference to the Examples below; however, the technical scope of the present invention is not limited to the Examples.

Examples 1 and 2

In Examples 1 and 2, a fuel cell comprising a fuel containing a reducing fuel and an imidazole compound as a heterocyclic compound containing nitrogen and carbon atoms and having 5- or 6-membered ring, and a non-catalytic anode electrode was prepared, and battery characteristics of the fuel cell were evaluated.

Figure 2:
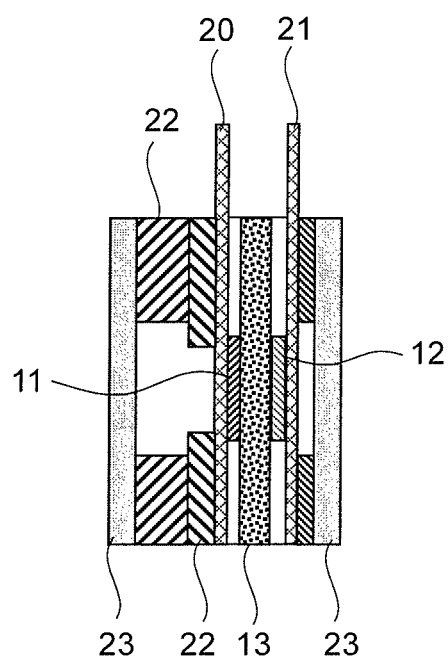
FIG. 2 shows a cross-sectional view of a test piece of a fuel cell prepared in one of the Examples.

Specifically, in Examples 1 and 2, a test cell, which is schematically shown in FIG. 2, was prepared for evaluation of power output characteristics. The test cell shown in FIG. 2 has a structure in which an anode electrode 11 and a cathode electrode 12 face each other across an electrolyte membrane 13. In addition, the test cell shown in FIG. 2 comprises an anode current collector 20, which is disposed to be in contact with an anode electrode 11, and a cathode current collector 21, which is disposed to be in contact with a cathode electrode 12. Further, the test cell shown in FIG. 2 comprises a layered structure comprising the anode current collector 20, the anode electrode 11, the electrolyte membrane 13, the cathode electrode 12, and the cathode current collector 21, such layered structure being sandwiched between layers of silicon 22, and such layers of silicon 22 being sandwiched between a pair of acrylic plates 23. More specifically, the test cell was prepared in the manner described below.

(1-1) Preparation of an Anode Electrode 11

A dispersion solution of a mixture of carbon black, 10% polyvinyl pyridine, and N-methylpyrrolidone was applied to a piece of carbon felt (Toray Industries, Inc.; product name: TORAYCA Mat) cut to a size of 1 cm$^2$, followed by drying. Thus, an anode electrode 11 was prepared.

(1-2) Preparation of a Cathode Electrode 12

A dispersion solution of a mixture of carbon black, 10% polyvinyl pyridine, and N-methylpyrrolidone was applied to a piece of carbon felt (Toray Industries, Inc.; product name: TORAYCA Mat) cut to a size of 1 cm$^2$, followed by drying. Thus, a cathode electrode 12 was prepared.

(1-3) Preparation of a Fuel Cell in Example 1

A layered structure comprising an anode current collector 20, an anode electrode 11, an electrolyte membrane 13, a cathode electrode 12, and a cathode current collector 21 was prepared using the anode electrode 11 and the cathode electrode 12 prepared above. Then, a fuel cell (Example 1) was prepared by supplying 2M sodium ascorbate and a 1M imidazole-HCl (pH 7.0) solution to the anode electrode 11 and a 1M potassium ferricyanide solution to the cathode.

(2-3) Preparation of a Fuel Cell in Example 2

A fuel cell in Example 2 was prepared as in the case of the fuel cell in Example 1 except that 1M reduced nicotinamide adenine dinucleotide was used instead of 2M sodium ascorbate as a reductant contained in the fuel to be supplied to the anode.

(3-3) Preparation of a Fuel Cell in Comparative Example 1

A fuel cell in Comparative Example 1 was prepared as in the case of the fuel cell in Example 1 except that a 2M sodium ascorbate solution (a solution not containing 1M imidazole-HCl) was used as the fuel to be supplied to the anode.

<Evaluation of Fuel Cell Characteristics>

Battery characteristics of the fuel cells in Example 1, Example 2, and Comparative Example 1 prepared above were evaluated. Specifically, fuel cell power output was determined using, as an external load unit, an ELECTRONIC Load PLZ164WA (KIKUSUI), which was serially connected between the fuel cell electrodes, and WAVY FOR PLZ-4W software (KIKUSUI). Fuel cell power output was determined at room temperature (approximately 25° C.).

Figure 3:
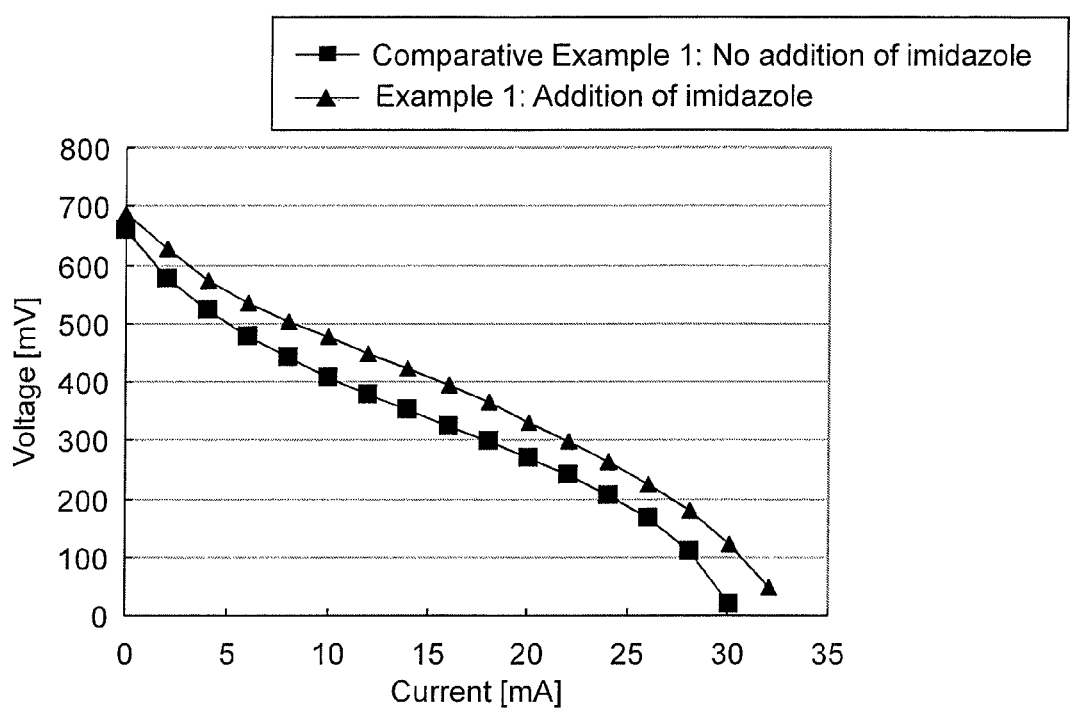
FIG. 3 is a characteristic diagram showing the results of comparing the fuel cells prepared in Example 1 and Comparative Example 1 in terms of fuel cell characteristics.

FIG. 3 shows the results of comparing the fuel cell power output of the fuel cell in Example 1 with that of the fuel cell in Comparative Example 1. As shown in FIG. 3, the power output of the fuel cell in Example 1 was 6.6 mW/cm² while the power output of the fuel cell in Comparative Example 1 was 5.4 mW/cm².

Figure 4:
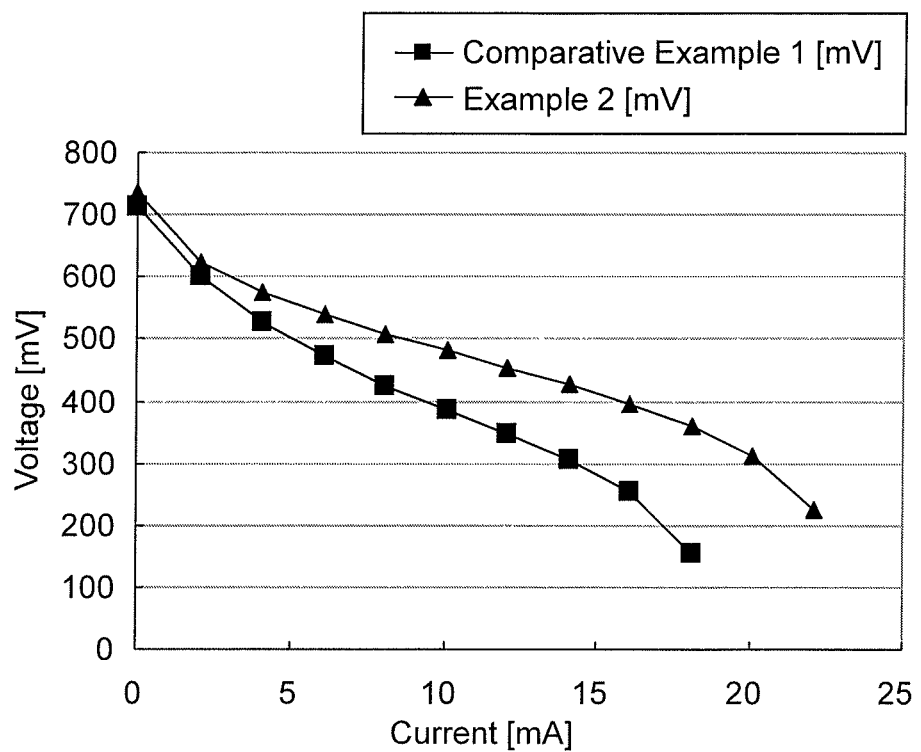
FIG. 4 is a characteristic diagram showing the results of comparing the fuel cells prepared in Example 2 and Comparative Example 1 in terms of fuel cell characteristics.

In addition, FIG. 4 shows the results of comparing the fuel cell power output between the fuel cell in Example 2 with that of the fuel cell in Comparative Example 1. As shown in FIG. 4, the power output of the fuel cell in Example 1 was 6.51 mW/cm² while the power output of the fuel cell in Comparative Example 1 was 4.28 mW/cm².

The above results indicated that excellent battery characteristics can be realized by causing an oxidation reaction of a reductant in the presence of an imidazole compound in fuel cells in which a fuel containing a reductant such as ascorbic acid or NADH is supplied to the non-catalytic anode electrode 11 to cause auto-oxidation of the reductant so as to generate electric power.

Examples 3-7

In Examples 3-7, fuel cells were prepared as in the case of the fuel cell in Example 1 with the use of different heterocyclic compounds as heterocyclic compounds containing a 5- or 6-membered ring of nitrogen and carbon atoms, and fuel cell characteristics of the fuel cells were evaluated. That is, fuel cells (fuel cells containing 2M sodium ascorbate as a reductant and fuel cells containing NADH as a reductant) were prepared in Examples 3-7 as in Examples 1 and 2 except that the heterocyclic compounds listed in table 1 were used instead of 1M imidazole-HCl. Note that the molecular weight of polyvinylimidazole used in Example 6 was 111500.

TABLE 1

|  | Compound |
| --- | --- |
| Example 3 | 1M Pyrazole |
| Example 4 | 1M Thiazole |
| Example 5 | 1M 1-Vinylimidazole |
| Example 6 | 1M Polyvinylimidazole |
| Example 7 | 0.2M Histidine |

Battery characteristics of the prepared fuel cells were evaluated as in Examples 1 and 2. Specifically, fuel cell power output was determined using, as an external load unit, an ELECTRONIC Load PLZ164WA (KIKUSUI), which was serially connected between the fuel cell electrodes, and WAVY FOR PLZ-4W software (KIKUSUI). Fuel cell power output was determined at room temperature (approximately 25° C.).

Figure 5:
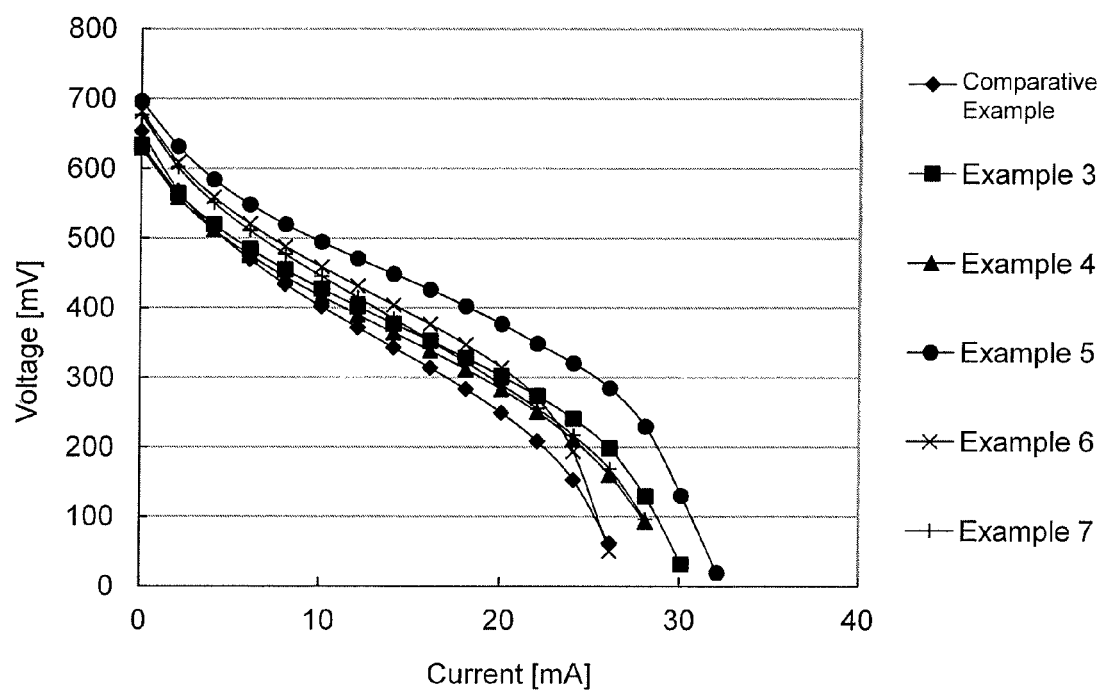
FIG. 5 is a characteristic diagram showing the results of determining fuel cell characteristics of the fuel cells prepared in Examples 3-7 (each fuel cell containing 2M sodium ascorbate as a reductant).

Table 2 and FIG. 5 show the results of determining fuel cell power output for the fuel cells in Examples 3-7 in which 2M sodium ascorbate was used. Also, table 2 and FIG. 5 show the results of determining fuel cell power output for a fuel cell in which a 2M sodium ascorbate solution not containing the above heterocyclic compound was used (Comparative Example).

TABLE 2

|  | Compound | Power density (mW/cm²) |
| --- | --- | --- |
| Comparative Example | 2M Sodium ascorbate | 5.13 |
| Example 3 | 1M Pyrazole | 6.07 |
| Example 4 | 1M Thiazole | 5.69 |
| Example 5 | 1M 1-Vinylimidazole | 7.73 |

TABLE 2-continued

|  | Compound | Power density (mW/cm²) |
| --- | --- | --- |
| Example 6 | 1M Polyvinylimidazole | 6.31 |
| Example 7 | 0.2M Histidine | 5.83 |

Figure 6:
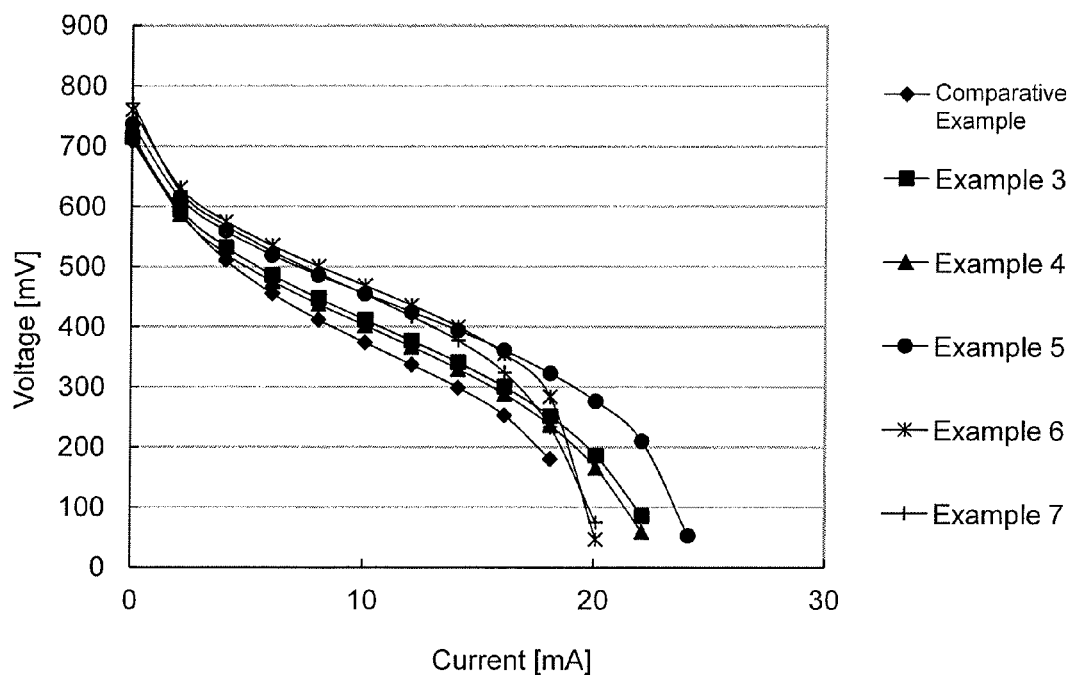
FIG. 6 is a characteristic diagram showing the results of determining fuel cell characteristics of the fuel cells prepared in Examples 3-7 (each fuel cell containing NADH as a reductant).

Table 3 and FIG. 6 show the results of determining fuel cell power output for the fuel cells containing NADH in Examples 3-7. Also, table 2 and FIG. 5 show the results of determining fuel cell power output for a fuel cell in which an NADH solution not containing the above heterocyclic compound was used (Comparative Example).

TABLE 3

|  | Compound | Power density (mW/cm²) |
| --- | --- | --- |
| Comparative Example | 0.5M NADH | 4.22 |
| Example 3 | 1M Pyrazole | 4.83 |
| Example 4 | 1M Thiazole | 4.65 |
| Example 5 | 1M 1-Vinylimidazole | 5.84 |
| Example 6 | 1M Polyvinylimidazole | 5.71 |
| Example 7 | 0.2M Histidine | 5.31 |

As is understood from tables 2 and 3 and FIGS. 5 and 6, it was shown that excellent fuel cell characteristics can be realized by causing an oxidation reaction of a reductant in the presence of a variety of heterocyclic compounds listed in table 1 in fuel cells in which a fuel containing a reductant such as ascorbic acid or NADH is supplied to the non-catalytic anode electrode 11 to cause auto-oxidation of the reductant so as to generate electric power.

It was demonstrated that remarkably excellent fuel cell characteristics can be realized by causing an oxidation reaction of a reductant in the presence of 1-vinylimidazole or polyvinylimidazole, especially in fuel cells in which a reductant such as ascorbic acid or NADH is used.

REFERENCE SIGNS LIST

1: Fuel cell, 11: Anode electrode, 12: Cathode electrode, 13: Electrolyte membrane All publications, patents, and patent applications cited herein are incorporated herein by reference in their entirety.

The invention claimed is:

1. A fuel cell, comprising an anode electrode, a cathode electrode, and a membrane having ion conductivity that is disposed between the anode electrode and the cathode electrode,
    wherein the anode further comprises (i) at least one reducing fuel selected from the group consisting of ascorbic acid, reduced nicotinamide adenine dinucleotide, and reduced nicotinamide adenine dinucleotide phosphate, and (ii) a heterocyclic compound containing an imidazole ring,
    the at least one reducing fuel in the anode electrode is oxidized in the presence of the heterocyclic compound, and
    the fuel cell does not include an enzyme for biofuel cells.

2. The fuel cell according to claim 1, wherein the anode electrode contains neither a noble metal catalyst nor an enzyme.

3. The fuel cell according to claim 1, wherein the reducing fuel is sodium ascorbate or reduced nicotinamide adenine dinucleotide.

4. The fuel cell according to claim 1, wherein the heterocyclic compound is contained in a reducing fuel that comes into contact with the anode electrode.

5. The fuel cell according to claim 1, wherein the heterocyclic compound is present on the surface of the anode electrode, with which the reducing fuel comes into contact.

6. The fuel cell according to claim 1, wherein the reducing fuel contains the compound at a concentration of 0.2-5.0M.

7. The fuel cell according to claim 1, wherein the anode electrode comprises a carbon material.

8. The fuel cell according to claim 1, wherein the heterocyclic compound is at least one compound selected from the group consisting of imidazole-HCl, pyrazole, thiazole, 1-vinylimidazole, polyvinylimidazole, and histidine.

9. The fuel cell according to claim 8, wherein the heterocyclic compound is imidazole-HC1, pyrazole, thiazole, 1-vinylimidazole, polyvinylimidazole, or histidine.

\* \* \* \* \*